United States Patent [19]

Martin

[11] Patent Number: 4,568,081
[45] Date of Patent: Feb. 4, 1986

[54] INFLATION NEEDLE LUBRICATING PLUG INSERT-TYPE VALVE ASSEMBLY

[75] Inventor: Robin A. Martin, Park Ridge, Ill.

[73] Assignee: Wilson Sporting Goods Company, River Grove, Ill.

[21] Appl. No.: 660,442

[22] Filed: Oct. 12, 1984

Related U.S. Application Data

[63] Continuation-in-part of Ser. No. 484,643, Apr. 13, 1983, abandoned.

[51] Int. Cl.$^4$ .............................................. A63B 41/00
[52] U.S. Cl. ................................... 273/65 C; 524/261; 273/65 D
[58] Field of Search .................. 273/65 C, 65 D, 58 J; 524/261; 251/368; 137/846

[56] References Cited

U.S. PATENT DOCUMENTS

| | | | |
|---|---|---|---|
| 2,934,344 | 4/1960 | Chupa | 273/58 J |
| 2,935,320 | 5/1960 | Chupa | 273/58 J |
| 3,098,779 | 7/1963 | Cox | 273/65 C |
| 3,100,498 | 8/1963 | Gibson | 273/65 C |
| 4,341,382 | 7/1982 | Arnold | 273/65 D |

FOREIGN PATENT DOCUMENTS 436828  7/1974  U.S.S.R. ...................... 524/261

Primary Examiner—George J. Marlo

[57] ABSTRACT

A self-lubricating plug insert-type valve assembly is provided for use with inflatable articles of manufacture, such as footballs, basketballs, etc. The sealing plug through which the inflation needle is inserted is characterized by containing 3–12 parts by weight of a silicone grease for each 100 parts of rubber contained therein. Although contained as part of the rubber mix of the cured plug, the grease migrates within the plug and forms a continually renewed lubricant coating along the passage through which the needle is inserted and withdrawn.

5 Claims, 6 Drawing Figures

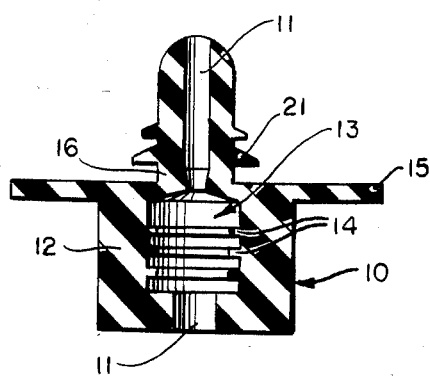
FIG. 1
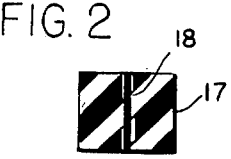
FIG. 2
FIG. 3
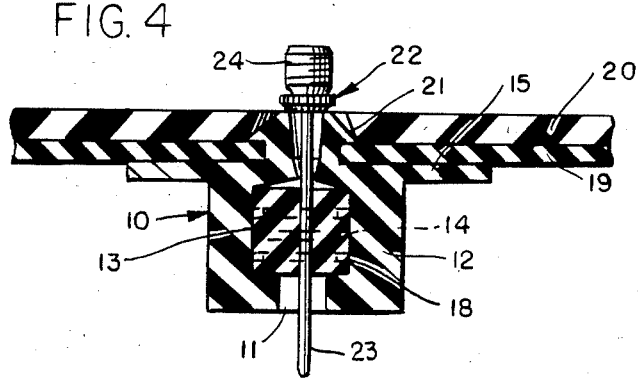
FIG. 4
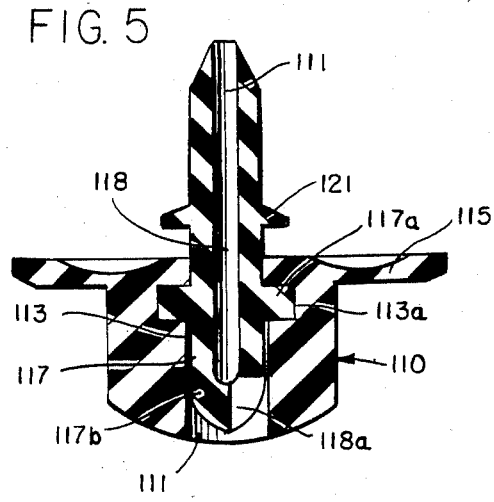
FIG. 5
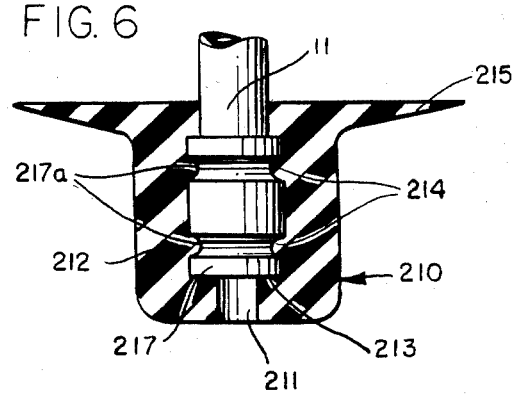
FIG. 6

INFLATION NEEDLE LUBRICATING PLUG INSERT-TYPE VALVE ASSEMBLY

RELATED APPLICATION

This application is a continuation in part of co-pending application Ser. No. 484,643, filed Apr. 13, 1983 now abandoned.

BACKGROUND AND PRIOR ART

The field of this invention relates to inflation valve assemblies of the plug insert-type. Such valve assemblies have been commonly employed with inflatable balls, such as footballs, basketballs, etc., which include a bladder within an outer covering. The assembly comprises a housing which is sealed to the bladder and provides a passage extending from the outside of the ball to the interior of the bladder, and the passage also includes a chamber which receives the sealing plug. To inflate the ball, an inflation needle is extended into the ball through the plug, usually through a preformed passage. Such valve assemblies are disclosed, for example, in U.S. Pat. Nos. 2,935,320, 3,100,498, 4,311,307, and 4,341,382.

When valves of the plug-insert type are used for balls for vigorous sports such as basketball, football, soccer, etc., as well as in playground balls and punching bags, the valves are subjected to extreme use conditions at both indoor and outdoor temperatures. Further, to keep the balls at the proper air inflation for optimum performance frequent additions of air are required. This means that the inflation needle is repeatedly inserted through the valve plug and removed therefrom under a variety of temperature and weather conditions. It has been found that valve failures resulting in leakage of air through the valve occur primarily because of the deterioration of the sealing plugs. For example, the plugs may take a "compression set," which interferes with the sealing engagement between the outside surfaces of the plug and the valve housing within which it is secured. Even more frequently, the insertion and/or removal of the needle causes tearing or enlargement of the passage through which it extends. This interferes with the self-closing action of the passage on withdrawal of the needle. Although lubrication of the inflation needles by users could help to alleviate the problem, it has not been found practical to instruct users to carry out such lubrication.

One attempt to solve this problem has met with a limited degree of success with respect to a valve used in basketballs. The needle insertion passage of the plug was provided with an enlarged recess or "sump" into which the manufacturer inserted a small quantity of liquid glycerin. Then in the filling of the balls passage of the inflation needle through the glycerin containing sump will provide a lubricant coating on the needle, which will be spread to some extent over the surfaces of the passageway. It was found, however, that the supply of glycerin in the sump is rather quickly used up, long before the end of the useful life of the ball and valve assembly. Further, this sump valve design did not lend itself to use with balls, such as footballs, where the bladders are not bonded to the covers. The glycerin-containing valves therefore have received only limited commercial use.

A plug insert-type valve including a liquid-receiving sump is disclosed in U.S. Pat. No. 2,934,344. As described in that patent, the sump is not used to provide a lubrication action. Instead, the sump is designed to collect liquid plasticizer exuded by the plug which is formed from a plasticizer-containing plastic resin. As described, the viscous plasticizer in the sump provides a sealing action, which assists in maintaining an air-tight seal.

SUMMARY OF INVENTION

This invention is based on two interrelated discoveries. First, it has been found that the plug inserts for valves of the plug sealing type provide better and longer performance under field conditions of use if prepared from rubber mixes which on being molded and cured provide a soft, deformable, resilient character to the plug. Such properties are most easily obtainable by using a rubber mix in which the rubber is substantially entirely natural rubber. Where substantial amounts of synthetic rubber are present, the plugs may not have adequate resilience or recovery from deformation, in effect, taking a compression set. Further, as the synthetic rubbers like neoprene degrade, such as by oxidation, they tend to become harder and more brittle. Rubber formulations based on natural rubber, however, tend to become softer as they are subjected to oxidation.

Secondly and of even greater importance for maximizing valve life, it has been found that the plugs can be made self-lubricating by incorporating a minor proportion of a silicone grease in the rubber mix. For example, as little as five parts of a dimethyl polysiloxane grease per 100 parts of natural rubber provides an effective long-term lubricating action. Although the silicone grease is included in the mix prior to it being molded and cured, it is not completely locked within the plug, but rather remains free to migrate. It has been found that a sufficient amount of the silicone grease within the plug reaches the needle insertion passageway, and, in effect, bleeds into the passageway so that the needle is effectively lubricated. Further, the repeated insertion and the withdrawal of the needle tends to "work" the walls of the plug passage, promoting the release of the silicone grease and its distribution within the passage. Friction between the needle and the plug is thereby greatly reduced, and there is less tendency for the plug to become distorted, or to take a compression set, and the plug is also effectively protected against gouging or tearing by the needle.

The maximum period of time in which the silicone grease will provide effective lubrication for the needle passage has not been determined, but appears to very much longer than the lubrication previously provided by the glycerin-containing sumps. It is believed that the lubricating action can be expected to continue throughout the useful life of the ball and bladder. Moreover, this lubrication does not appear to be temperature dependent. It remains effective under cold ambient conditions, such as in outdoor football use, as well as at indoor temperatures.

THE DRAWINGS

Valve assembly utilizing inserts formed in accordance with the present invention are illustrated in the accompanying drawings, wherein FIGS. 1-4 illustrate a valve adapted for use with a football;

FIG. 5 an alternate design of a football valve; and

FIG. 6, a valve assembly particularly adapted for use with basketballs. The insert plugs of all of these valve assemblies are formed from a rubber-based mix containing an effective lubricating amount of a silicone grease.

DETAILED DESCRIPTION

The valve assembly of this invention is useful for any inflatable objects of manufacture. The assembly includes a valve body providing a passage therethrough with a chamber portion, and a sealing plug inserted within the chamber portion and retained therein in sealing engagement with the adjacent wall portions of the passage. The plug is pierceable by an inflation needle to permit gas, usually air, to be forced into the inflatable article. The valve assembly has particular utility for use with balls having bladders, which may be attached or unattached to the covering of the ball. Such balls, for example, include footballs, basketballs, soccer balls, and the like. In general, these are premium balls which are used for long periods of time under strenuous conditions. Valves can also be used for analogous purposes such as in punching bags, and may even be useful in less expensive balls such as ordinary playground ball.

The valve bodies may be formed of a wide variety of moldable materials, such as plastics, synthetic rubber, natural rubber, etc. The valve bodies which provide the housing for the insertable plugs are relatively rigid, as compared with the plugs. It is the plugs which are deformed to force them into the chambers of the valve bodies so as to be retained therein in a slightly compressed condition. The valve bodies therefore may be formed of well known, conventional materials. For example, one suitable material for general use is a urethane-type rubber, such as a polyester-based urethane.

This invention concerns particularly the formulation of the sealing plugs, and the resulting properties obtained when the plugs are molded and cured. In general, the cured plugs should provide the characteristics or properties of being soft, deformable, and resilient. By "resilient" it is meant that the plugs exhibit a high degree of recovery on being compressed or deformed. Although the plugs may be formed of rubbers other than natural rubber, or of mixtures of natural rubber and synthetic rubber, it is preferred to utilize natural rubber as the primary elastomer. For example, optimum formulations contain the natural rubber as the only elastomer.

In accordance with the present invention, a minor proportion of a silicone grease is incorporated in the rubber mix before molding and curing, being uniformly distributed therethrough in the preparation of the mix. A sufficient amount of the silicone grease should be used to provide an effective lubricating action but not so much as to create any mechanical problems in preparing and molding the mix. Silicone greases are in paste or semi-liquid condition. Further, they are relatively expensive compared to other ingredients of the mix, and therefore it is undesirable to employ large excesses. However, small amounts of silicone grease (viz. 1% or less) are not effective for the purposes of this invention. An effective lubricating amount of the grease should be exudable from the plug. It is preferred to employ at least 3 parts of the silicone grease. For example, excellent lubricating properties are provided using 5 parts of the silicone grease per 100 parts of rubber. To assure maximum continued effective lubrication, more than 5 parts can be employed, but usually there will be no advantage in employing more than 12 parts of the silicone grease per 100 parts of rubber. The practical range is therefore from about 3 to 12 parts of silicone grease per 100 parts of rubber. A preferred silicone grease, which is readily available from commercial sources in the United States, is dimethyl polysiloxane grease. However, other silicone-type greases having similar properties can be employed.

It should be understood that the silicone grease-containing rubber mix will also be formulated with standard or conventional ingredients for preparing molded rubber products having the desired properties of softness, deformability, and resilience. These will usually include process oils, such as napthenic oil, zinc oxide, either with or without other fillers, such as silica flour, and carbon black, and cross-linking agents, such as particularly sulphur. The curing of the rubber during the cross-linking reaction may be controlled by the use of regulators including accelerators and/or retarders. For example, the accelerators may be benzothiazole disulfide, diphenyl guanidine, etc. The retarder may be salicyclic acid or phthalic anhydride. In addition, antioxidants will usually be included to protect the cured composition against air oxidation. For example, such antioxidants include Antioxident 2246, and Santovar A.

It will also be understood that the rubber mixes may be colored by the addition of pigments. Where carbon black is employed as a filler, a black color will be obtained, but for other colors, such as green, or red, the use of pigments is needed.

An illustrative general formula for the rubber mixes of this invention is set out below.

| General Formula | |
|---|---|
| Ingredients | Parts by Weight |
| Natural Rubber | 100 |
| Silicone Grease | 1–15 |
| Process Oil | 5–25 |
| Zinc Oxide | 5–30 |
| Silica Flour | 0–25 |
| Carbon Black | 0–25 |
| Sulphur | 2–3 |
| Accelerators | 0.95–3.0 |
| Retarders | 0–1.5 |
| Antioxidants | 1–2 |
| Pigment | 0–1 |

Turning now to the accompanying drawing, three valve assemblies are shown having valve inserts which may be made in accordance with the present invention. The valve of FIGS. 1–4 is designed for use with a football. It includes a valve body designated generally by the number 10, which includes a passage 11 therethrough. The enlarged housing portion 12 provides a chamber 13 having spaced circumferential ribs 14. Also, integrally formed with housing 12 and immediately threabove is an outwardly extending flange portion 15, which is centrally connected to an upwardly projecting nipple portion 16. Passage 11 extends through the nipple 16, as shown.

The insert plug for the valve body of FIG. 1 is shown in FIGS. 2 and 3. It consists of a cylindrically shaped body 17. Through the center of the plug 17 there extends a self-closing passage 18. Preferably this passage is performed to guide the insertion of the needle. It will be understood that plug 17 is formed of the silicone grease-containing rubber mix, as described above, which is preferably a natural rubber mix containing from 3 to 12 parts of dimethyl siloxane grease per 100 parts of rubber. In the assembly of the valve, the soft, deformable, resilient plug 17 is forced into the chamber 13 through the lower end of passage 11, and is seated within the chamber as illustrated in FIG. 4. The ribs 14 press against and sealingly engage the side walls of the plug, which is dimensioned so that it is maintained in a slightly compressed condition when inserted. This slight compression assists in retaining the plug and also promotes the self-closing action of the passage 18.

As shown in FIG. 4, the flange 15 of the valve body has been vulcanized to the inside wall of a bladder 19, which is contained within a cover 20 non-attached relation thereto. This assembly is one which could be used in a football. As will be noted, the outwardly projecting portion of the nipple 16 has been cut off immediately above the retaining flange 21. In manufacturing, the outer portion of the nipple 16 is used to assist in pulling the valve assembly into proper relation with the cover and bladder, as shown in FIG. 4, and is thereafter cut off to provide an outer surface which is slightly depressed with respect to the outer surface of the cover.

As shown in FIG. 4, an inflation needle 22 has been inserted through the plug 17, the hollow needle including the piercing shaft portion 23, which when fully inserted extends inwardly beyond the valve body, and the outer enlarged threaded end 24 to which the air supply hose is connected.

In FIG. 5, there is shown an alternate valve assembly for use with a football. For convenience of reference, corresponding parts to the valve assembly of FIGS. 1–5 have been given the same numbers except that the numbers have been increased by 100. As shown, the valve body 110 which provides the insert receiving passage 111 has an outwardly extending cylindrical portion 113a into which is received the collar portion 117a of the insert 117. The passage 111 is an open bore from its upper end down to the solid bottom partion 117b, which is provided with a self-closing slit 118a that communicates with the lower end of the passage 118, and performs the same function as passage 18 in the embodiment of FIGS. 1–4. As explained in connection with the prior embodiment, the bladder and ball cover will be received between the flanges 115 and 121, the top of the flange 115 being bonded to the inner wall of the bladder. On completion of the assembly, the insert 111 will be cut off above the flange 121 to provide a completed assembly similar to that shown in FIG. 4.

The valve assembly of FIG. 6 is particularly adapted for use with a basketball. For convenience of reference, the same numbers have been used as with respect to the embodiment of FIGS. 1-4, except that the numbers have been increased by 200. As will be noted, the valve insert 217 includes circular recesses 217a which receive and interlock with the annular ribs 214 provided on the walls of the enlarged chamber portion 213 of the valve body 210. The lower end of the opening 211 is of restricted cross section. With this embodiment, the valve body can be inserted through the upper end of the opening 211. A self-closing passage is provided through the center of plug 217, construction and operation of the passage being the same as that described with respect to passage 17 of plug 18. As will be appreciated, therefore, the insert plugs may be made in various sizes and shapes, using the formulation of the present invention to provide the desirable properties described above.

The application of this invention in commercially desirable embodiments is further illustrated by the following examples.

EXAMPLE I

Rubber formulations which may be employed and which are presently preferred for manufacturing the insert plugs of the valves shown in the drawings are as follows.

| Ingredients | Parts by Weight |
| --- | --- |
| Formula A for Insert Plug of FIGS. 2–4 | |
| SMR-50-CV (Natural Rubber) | 100.00 |
| Circo Light Oil | 10.00 |
| Zinc Oxide | 10.00 |
| Sulphur | 2.50 |
| Stearic Acid | 1.00 |
| M.B.T.S. | 0.80 |
| D.P.G. | 0.20 |
| SF-96 (Silicone Grease) | 5.00 |
| Antioxident 2246 | 1.00 |
| Green Pigment | To Tint |
| Effective cure rate: 7½ min. at 340° F. | |
| Formula B for Insert Plug of FIG. 5 | |
| SMR-50-CV (Natural Rubber) | 100.00 |
| Circo Light Oil | 10.00 |
| Zinc Oxide | 25.00 |
| Sulphur | 2.50 |
| M.B.T.S. | 0.80 |
| D.P.G. | 0.20 |
| Santovar A | 1.00 |
| SF-96 (Silicone Grease) | 5.00 |
| Stearic Acid | 1.00 |
| N-330 Black | 10.00 |
| Effective Cure Rate: 7½ min. at 340° F. | |
| Formula C for Insert Plug of FIG. 6 | |
| SMR-5-CV-60(Natural Rubber) | 100.00 |
| Zinc Oxide | 15.00 |
| Silene D | 15.00 |
| Sulphur | 2.00 |
| Santocure | 1.20 |
| D.O.T.G. | 0.60 |
| Retarder W. | 1.00 |
| Stearic Acid | 1.00 |
| Santovar A | 1.00 |
| N-330 Black | 10.00 |
| Viscasil 10,000 Fluid (Silicone Grease) | 5.00 |
| Circo Light Oil | 5.00 |
| Effective Cure Rate: 5 min. at 320° F. | |

The foregoing formulas include trade names and trade designations, which have the following meanings:

| Formula Designation | Chemical Description | Source |
| --- | --- | --- |
| SMR-50-CV | Natural Rubber | Generally available |
| SMR-5-CV-60 | Natural Rubber | Generally available |
| Circo Light Oil | Naphthenic Oil, ASTM D-2226, Type 103 | Sun Oil Co. |
| Zinc Oxide | Zinc Oxide | New Jersey Zinc Co. |
| Sulphur | Sulphur | Generally available |
| Stearic Acid | Stearic Acid | Generally available |
| M.B.T.S. | Benzothiozol Disulfide | American Cyanamide |
| D.P.G. | Diphenyl Guanadine | Monsanto |
| SF-96 | Dimethyl Polysiloxane Grease | General Electric |
| Antioxidant 2246 | 2.2′Methylene-bis- (4 methyl-6-1-butyl phenol) | American Cyanamide |
| Santovar A | 2,5-Di(tert-amyl) hydroquinone | Monsanto |
| Santocure | N—Cyclohexyl-2-benzothianzole-sulfonamide | Monsanto |
| Viscasil | Dimethyl Polysiloxane | Marnick Chemical Co. |

| Formula Designation | Chemical Description | Source |
|---|---|---|
| 10,000 Fluid | Grease | |
| Silene D | Hydrated Silica | Pittsburgh Plate Glass |
| D.O.T.G. | Di-ortho toluol guanidine | Generally available |
| Retarder W | Salicylic Acid | Uniroyal |
| N-330 Black | Carbon Black | Colombian |

The specifications of the above identified silicone greases are as follows:

SF-96 Grease
Type: Dimethyl Siloxane
Sp. Gr.: 0.97
Non-toxic, odorless, colorless.

Viscasil 10,000 Fluid
Type: Dimethyl Siloxane
Sp. Gr.: 0.975
Viscosity: 10,000 cps.
Flash Point: 600° F.
Non-toxic, odorless, colorless.

EXAMPLE II

An illustrative manufacturing procedure for formula A is as follows:

| Steps | Time (minutes) | |
|---|---|---|
| (1) | 00.00 | Add rubber to mill and form band. Cut and blend. Cool. |
| (2) | 03.30 | Start adding pre-blended Circo oil, Zinc Oxide and SF-96. Add slowly. Cut and blend. |
| (3) | 21.00 | Add Sulphur, Stearic Acid, and Antioxidant. Cut and blend. |
| (4) | 24.00 | Add Green Pigment, M.B.T.S., and D.P.G.. Add slowly. Cut and blend. |
| (5) | 28.00 | Sheet off. |

Molding

The molding time is 7½ min. Cure at 340° F. The total cycle is 10 minutes in a transfer-plunger type mold.

Formulas B and C are blended and molded in a similar manner.

I claim:

1. A valve assembly for an inflatable article of manufacturer, said valve assembly including a valve body proving a passage therethrough with a chamber portion, and a sealing plug inserted within said chamber portion and retained therein in sealing engagement with the adjacent wall portion of said passage, said plug having a passage pierceable by an inflation needle to permit gas to be forced into said inflatable article, wherein the improvement comprises forming said plug of a rubber-based mix providing a soft, deformable, resilient character to said plug when molded and cured, and having present in said plug as part of said mix from 3 to 12 parts by weight of a rubber-compatible silicone grease per each 100 parts of rubber, said silicone grease being exudable from said plug and the amount of grease in said plug providing the walls of said plug passage with an effective lubricating action which facilitates insertion and withdrawal of an inflation needle.

2. The improved valve assembly of claim 1 in which said silicone grease is a dimethyl polysiloxane grease.

3. The improved valve assembly of claim 1 in which the rubber in said mix is composed substantially entirely of natural rubber.

4. A valve assembly for an inflatable bladder, said valve assembly including a valve body providing a passage having a chamber portion, and a sealing plug inserted within said chamber portion and retained therein in sealing engagement with the adjacent wall portions of said passage, said plug having a passage pierceable by an inflation needle to permit gas to be forced into said bladder and including self-closing wall means for returning gas, wherein the improvement comprises forming said plug of a natural rubber-mix providing a soft, deformable, resilient character to said plug and having present in said plug as part of said mix from 3 to 12 parts by weight of a dimethyl polysiloxane grease per each 100 parts of the natural rubber, said grease being exudable from said plug and the amount of grease in said plug providing the walls of the plug passage with an effective lubricating action which facilitates insertion and withdrawal of an inflation needle.

5. A valve assembly for an inflatable bladder, said valve assembly including a valve body providing a passage having a chamber portion, and a sealing plug inserted within said chamber portion and retained therein in sealing engagement with the adjacent wall portions of said passage, said plug having a passage pierceable by an inflation needle to permit air to be forced into said bladder and including self-closing wall means for retaining said air wherein the improvement comprises forming said plug of a rubber-based mix providing a soft, deformable, resilient character to said plug, the rubber of said mix being substantially entirely natural rubber, and said mix including conventional rubber formulation ingredients selected from the class consisting of process oil, fillers, sulphur, accelerators, retarders, antioxidants, and pigments, and selected mixtures thereof, said rubber-based mix being characterized by containing from 3 to 12 parts of a dimethyl polysiloxane grease per 100 parts of natural rubber, said grease being exudable from said plug and the amount of grease in said plug providing the walls of the plug passage with an effective lubricating action which facilitates insertion and removal of an inflation needle.

* * * * *